United States Patent [19]

Chiotis

[11] Patent Number: 5,324,372
[45] Date of Patent: Jun. 28, 1994

[54] WATER-BASED LUBRICANT AND METHOD OF USE THEREOF

[75] Inventor: Achilles Chiotis, Mountain View, Calif.

[73] Assignee: Raychem Corporation, Menlo Park, Calif.

[21] Appl. No.: 895,314

[22] Filed: Jun. 8, 1992

[51] Int. Cl.⁵ .............................................. B32B 31/26
[52] U.S. Cl. ...................................... 156/84; 156/85; 156/86; 156/289; 264/230; 264/342 R
[58] Field of Search ............... 156/84, 85, 86, 289; 264/230, 342 R

[56] References Cited

U.S. PATENT DOCUMENTS

| | | | |
|---|---|---|---|
| 3,375,193 | 3/1968 | Ruzza et al. | 252/23 |
| 3,894,731 | 7/1975 | Evans | 264/230 |
| 3,985,852 | 10/1976 | Evans | 264/342 R |
| 4,032,010 | 6/1977 | Evans | 264/230 |
| 4,206,909 | 6/1980 | Wintle | 264/230 |
| 4,908,177 | 3/1990 | Hartner | 156/85 |

FOREIGN PATENT DOCUMENTS

4108486 9/1991 Fed. Rep. of Germany.

Primary Examiner—Caleb Weston
Attorney, Agent, or Firm—Sheri M. Novack; Herbert G. Burkard

[57] ABSTRACT

A process of placing a sleeve on a cable comprising:
A) wetting at least one of
  a) the internal surfaces of the sleeve and
  b) the external surfaces of a substrate on which the sleeve is to be placed with an aqueous mixture comprising a lubricant;
B) draining excess aqueous mixture from the wetted surfaces;
C) placing the sleeve into close and conforming contact with the substrate;
D) sliding the sleeve off of the substrate; and
E) placing the sleeve over the cable.

14 Claims, 5 Drawing Sheets

FIG_1

FIG_2a

FIG_2c

FIG_3

WATER-BASED LUBRICANT AND METHOD OF USE THEREOF

BACKGROUND OF THE INVENTION

The present invention relates to the field of heat shrinkable tubular articles such as sleeves and the use thereof. More specifically, the invention provides an improved lubricant and method of using the lubricant, especially in conjunction with the application of heat shrinkable sleeves to electrical wires and cables.

Heat shrinkable sleeves and their use are well known. For example, heat shrinkable sleeves and associated devices are disclosed in the U.S. Pat. Nos. 3,894,731, 4,868,023, 4,712,721, 4,478,252, 4,349,404, 3,894,731, 2,027,962, 4,969,402, and 4,514,031, all incorporated herein by reference for all purposes. Such sleeves are used, for example, to protect cable splices from environmental attack, and to provide visual markings for identification of a particular wire or group of wires. Commercially, such sleeves are represented by the Thermofit ® marker system manufactured by the assignee of the present invention.

One method of applying heat shrinkable sleeves (i.e., short lengths of tubing) to wires or cables involves the use of a carrier of the sleeves such as a bandolier. Heat shrinkable sleeves are affixed to the bandolier for ease of handling. The bandolier enables markkng of the heat shrinkable sleeves for later installation on and identification of a particular cable or wire. A technician can easily slide the sleeve off of the bandolier, and apply the marked sleeve to a cable or wire. The sleeve may then be heated or otherwise treated at a later convenient time so as to firmly attach it to the wire or cable and/or to permatize the indicia marked on it.

The sleeve is preferably sized such that it fits snugly on the bandolier to prevent sliding off of the sleeve before it is marked. However, if the sleeve fits too snugly on the bandolier, removal of the sleeve from the bandolier is sometimes difficult. Accordingly, various lubricants have been applied to the sleeve and/or the bandolier to facilitate removal of the sleeve.

Most commonly, such lubricants have been applied by dispersing the lubricant in a suitable organic carrier and applying the dispersed lubricant to the inner surface of the sleeve and/or to the outer surface of the bandolier. Normally such lubricants are dispersed in a low boiling point chlorofluorocarbon such as material marketed under the name Freon*.

*a trade mark of du Pont Corporation

Recently, problems have arisen with the use of such chlorofluorocarbons. Importantly, it has been asserted that chlorofluorocarbons present an environmental threat, primarily resulting from ozone depletion. Accordingly, many industries are attempting to reduce or eliminate the use of chlorofluorocarbons to abate global warming and ozone depletion. Efforts to replace chlorofluorocarbons have, however, been directed primarily at the largest volume users of such materials. For example, replacements for Freon as a refrigerant, and replacements for the various chlorofluorocarbons used in the electronic industry as cleaning solvents have been proposed. These efforts have not addressed in a substantial way the needs of industries which use chlorofluorocarbons as a lubricant carrier, however.

From the above it is seen that an improved composition and method for lubricating parts such as heat shrinkable sleeves is needed.

SUMMARY OF THE INVENTION

An improved lubricating composition and an improved method of lubricating heat shrinkable sleeves on a bandolier and other surfaces is provided by virtue of the present invention. The invention provides an environmentally safe replacement for chlorofluorocarbon based dispersants for lubricants. The lubricant is easily used and provides for a low frictional force between two lubricated surfaces.

In one aspect of the invention, the lubricant is an aqueous dispersion. The dispersion includes an appropriate lubricant, which in a preferred embodiment is calcium stearate and a surfactant that provides appropriate surface tension characteristics. In a preferred embodiment, the surfactant reduces the surface tension of the dispersion to less than about 75 dynes/cm. preferably less than about 50 dynes/cm, and more preferably less than about 30 dynes/cm. According to a preferred aspect of the invention, the surfactant is sodium dioctyl sulfosuccinate or a fluorinated alkyl polyoxethylene ethanol.

Heat shrinkable sleeves and a method of applying heat shrinkable sleeves to a substrate are also provided by virtue of the present invention. According to one aspect of the method, a heat shrinkable sleeve is applied to an application substrate. The sleeve is marked, and then slid off of the application substrate for placement on a wire, cable, or similar electrical or optical conductor. The application substrate and/or the sleeve is lubricated with an aqueous dispersion of a metal stearate and a surfactant.

A further understanding of the nature and advantages of the inventions herein may be realized by reference to the remaining portions of the specification and the attached drawings.

DESCRIPTION OF THE PREFERRED EMBODIMENTS

Contents

I. Overall Description of the Invention
II. Examples
III. Conclusion

I. Overall Description of the Invention

Figure 1:
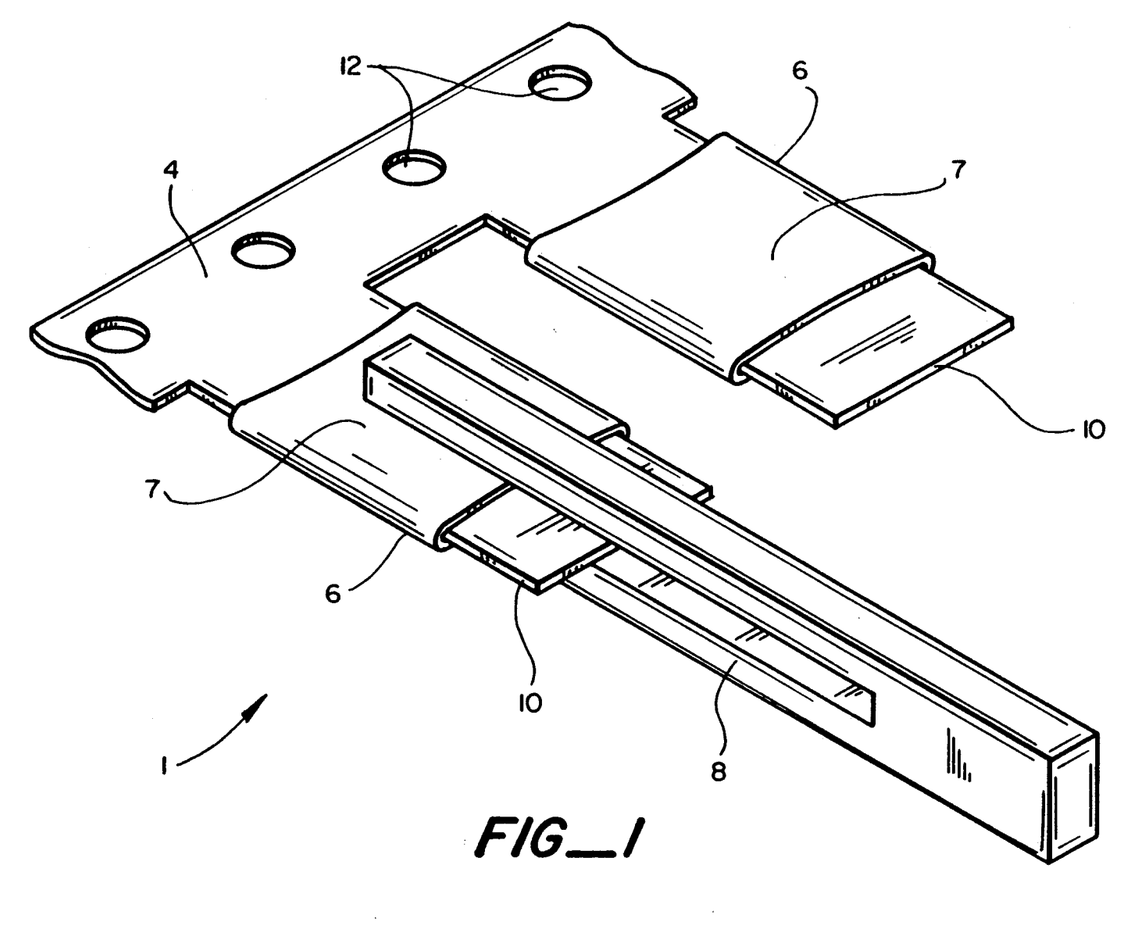
FIG. 1 is a drawing illustrating use of the invention with a bandolier/heat shrinkable sleeve.
Figure 2A:
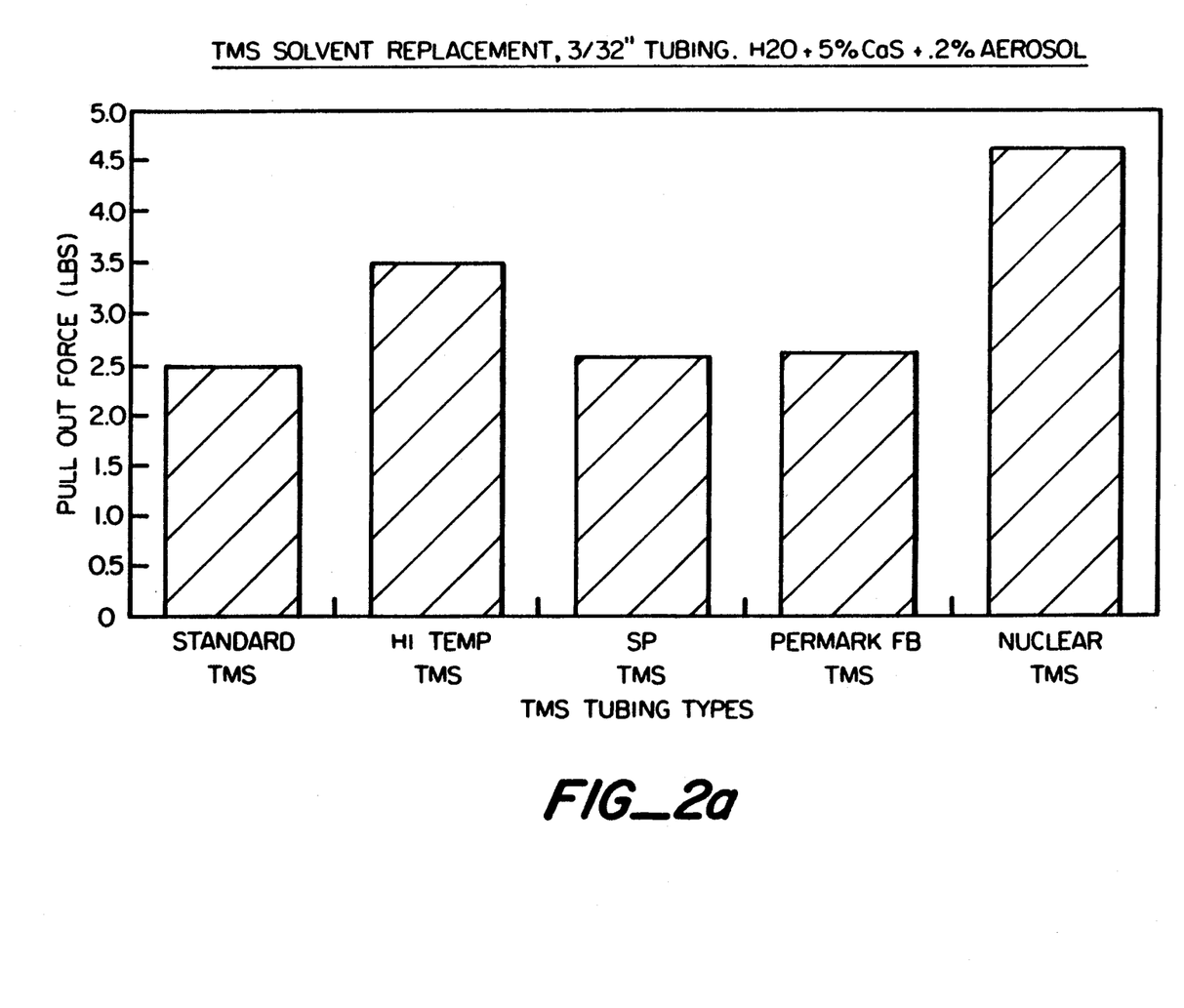
FIGS. 2a to 2c illustrate the pullout force required for removal of a heat shrinkable sleeve from an application substrate for various sizes and materials of the sleeve.
Figure 2B:
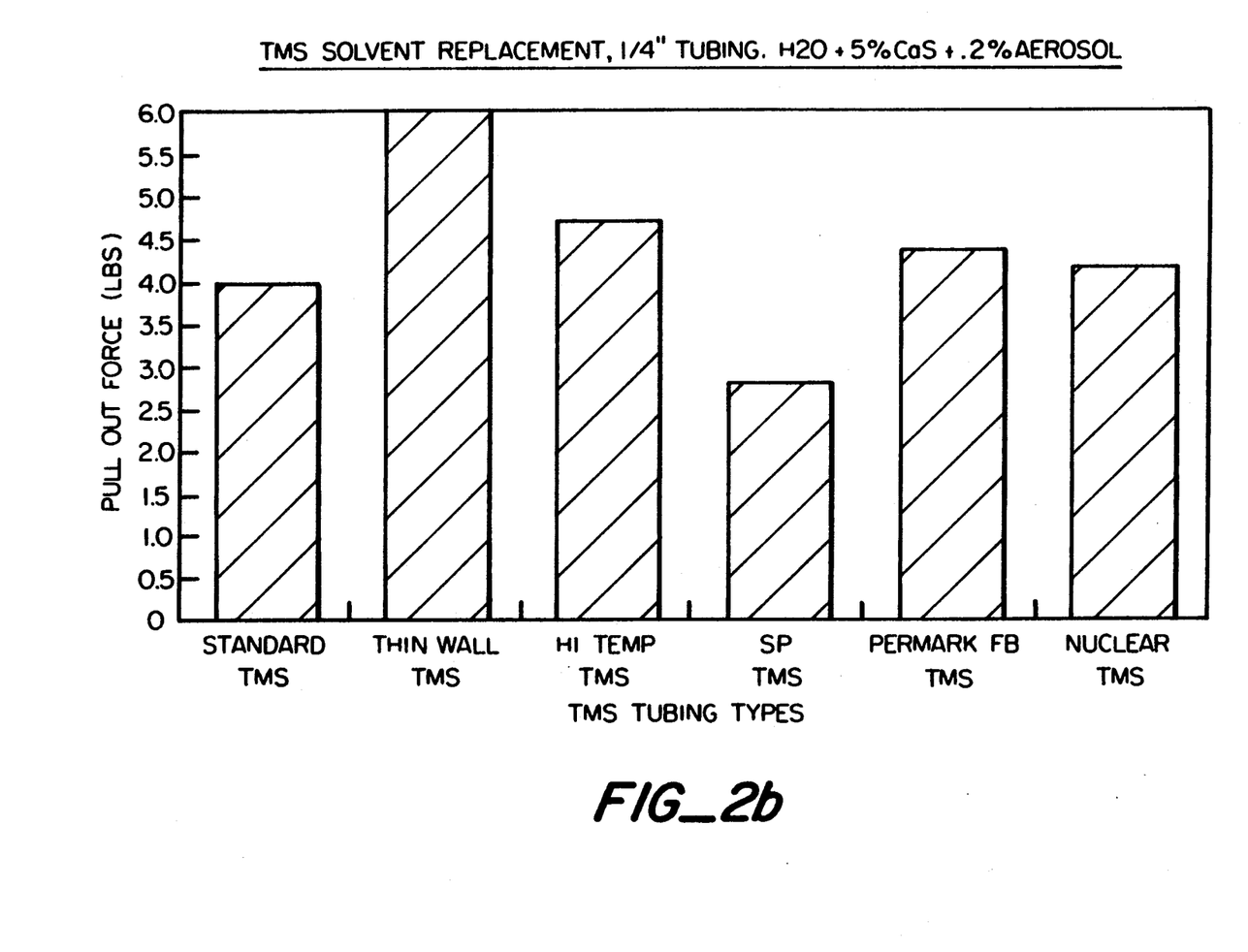
Figure 2C:
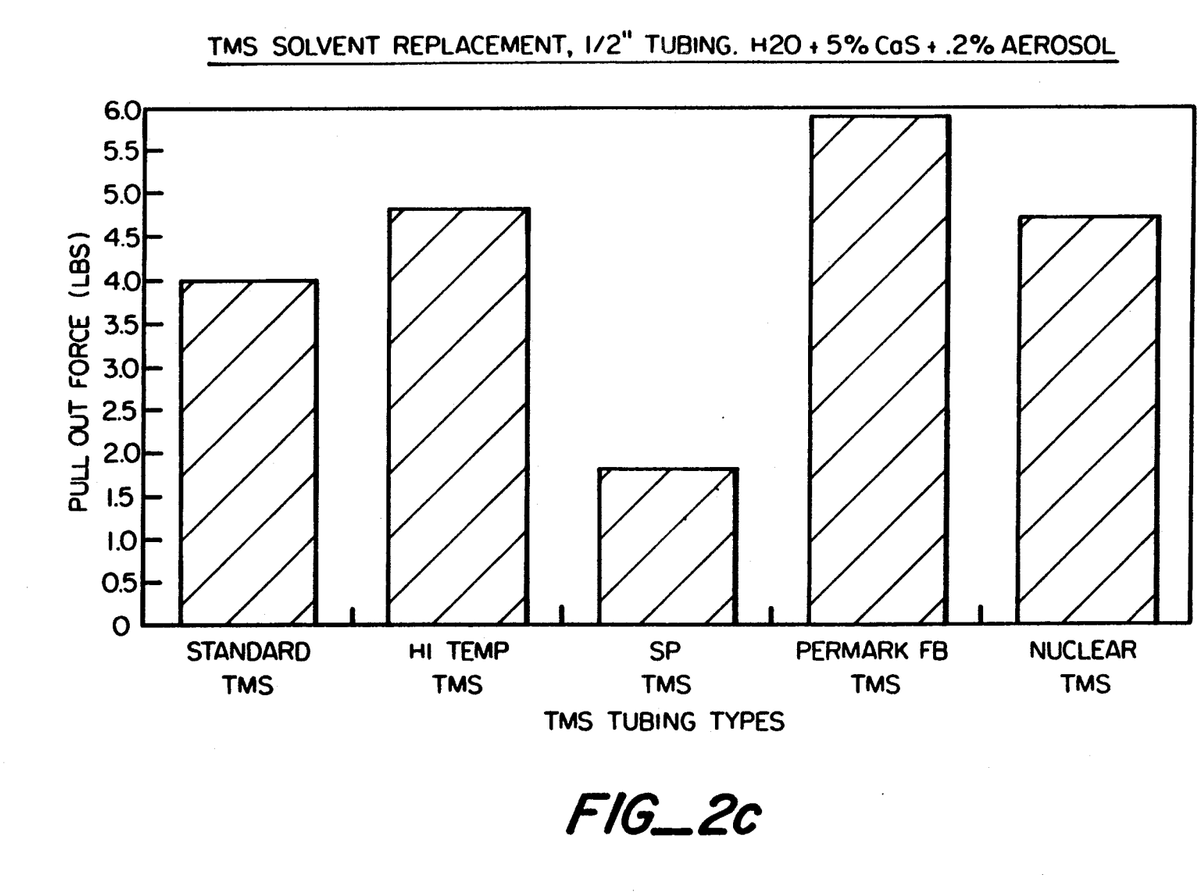

As shown in FIG. 1 the invention provides an improved method, device, and lubricant for use in conjunction with an assembly 2. The assembly includes an application substrate 4 that is used to facilitate the marking of sleeves 6. The marker sleeves are preferably manufactured from a polymeric tubular article such as tubing which is rendered heat recoverable by crosslinking the tubing, heating the tubing to a temperature above the crystalline melting point or softening point of the polymeric material, deforming the tube radially outwardly and cooling the tubing while it is in the deformed state. In use, since the deformed state of the article is heat unstable, application of heat will cause the tubing to revert to or toward its original (undeformed) heat stable configuration.

The sleeves 6 are applied to elongated fingers (tines) 10 of the application substrate 4. The sleeves are applied to the fingers in a snug fitting relationship, and preferably pre-shrunk to at least a limited degree to ensure a conforming fit on the fingers and thereby provide a flat marking surface 7. In most preferred embodiments, the substrate 4 is elongated to include a large number of fingers, although only 2 are shown in FIG. 1 for the sake of simplicity. Accordingly, the substrate with sleeves placed on many fingers takes on the form of a bandolier.

To further aid in the placement of markings on the sleeves 6, apertures 12 are provided in the substrate 4 at appropriate locations to enable the use of a conventional computer paper tractor drive assembly in conjunction with the printing of markings on the sleeves 6.

After marking the sleeve, the user grips the sleeve using tool 8 and pulls it off of the bandolier, preferably using a tool such as provided with the Thermofit Marking System (TMS ®) system. The sleeve is then applied to the cable and, in most embodiments, the sleeve is further shrunk so that it fits snugly on the cable. It is to be understood that the terms "cable" and "wire" are used interchangeably herein and that either may refer to a wire, insulated or not insulated. to a group of wires that are mechanically held together in a bundle, or to other various elongate conductors such as coaxial cable, optical fiber assemblies, and the like. The sleeve is shrunk through the application of heat, irradiation, or the like. Application systems such as the one shown in FIG. 1 include, for example, the TMS ® marking assembly.

Since the sleeves 6 are provided in a slidable but snug fitting relationship with the finger 10, and since a force must be applied to the interface between the sleeve and substrate for removal, removal of the sleeves from the fingers can sometimes be difficult. Accordingly, measures must be taken to reduce the amount of friction between a sleeve and the finger on which it is mounted. Friction is reduced to a degree through appropriate material selection. For example, according to some embodiments the application substrate is made of one of the nylons or any of various polyolefins or fluoropolymers, while the sleeve is made from a heat shrinkable material such as a polyolefin or a fluoropolymer. Preferably the entire sleeve is made from a composition comprising, for example, an olefin polymer, but a composite article in which a surface layer only comprises an llefin polymer may be employed.

The terms "olefin polymer" and "polyolefin" are used herein to refer to homo and copolymers of olefins, for example, polyethylene, e.g., linear high density polyethylene or low density polyethylene, ethylene/ethyl acrylate copolymers, ethylene/vinyl acetate copolymers, ethylene/methyl acrylate copolymers, and the like. Blends containing one or more of these polymers together with other polymers, e.g., ethylene/propylene/diene terpolymers, can also be used.

The olefin polymer composition from which the sleeve is prepared may contain various additives, for example, flame retardants such as decabromodiphenyl ether, perchloropentacyclodecane, silicone resins, 1,2-bis (tetrabromophthalimido) ethylene, etc.; antioxidants such as alkylated phenols, e.g., those commerically available as Goodrite 3125, Irganox 1010, Irganox 1035, Irganox 1076, Irganox 1093, Vulkanox BKF, organic phosphite or phosphates, e.g., dilauryl phosphite, Mark 1178, alkylidene polyphenols, e.g., Ethanol 330, thio-bis alkylated phenol, e.g., Syntonies R, dilauryl thiodipropionate, e.g., Carstob DLTDP, dimyristyl thiodipropionate, e.g., Carstab DMTDP, distearyl thiodipropionate, e.g., Cyanox STDP, amines, e.g., Wingstay 29, etc.; inorganic fillers, such as clay, silica etc.; pigments such as carbon black, titanium dioxide, zinc oxide, iron oxide, etc., processing aids, and the like. Certain additives may improve durability or permanence of marks while others may be detrimental, depending on the particular binder of the ink used to apply the mark and olefin polymer of the surface. It will be apparent that a wide range of materials may be used without departing from the scope of the present invention.

In the case of fluoropolymers, the sleeve may be, e.g., polyvinylidene fluoride and vinylidene fluoride copolymers, tetrafluoroethylene polymers, ethylene-tetrafluoroethylene copolymers, and the like. In a preferred embodiment the sleeve contains one or both of a thermoplastic fluoropolymer and an elastomeric fluoropolymer. The thermoplastic fluoropolymers and the elastomeric fluoropolymers are preferably a polymer made from one or more fluorinated monomers containing ethylenic unsaturation and optionally one or more other non fluorinated compounds containing ethylenic unsaturation. The fluorinated monomer may be a perfluorinated monoolefin, for example, hexafluoropropylene or tetrafluoroethylene, or a partially fluorinated monoolefin which may contain other substituents, e.g., chlorine or perfluoroalkoxy, for example, vinylidene fluoride, chlorotrifluoroethylene and perfluoroalkyl vinyl ethers in which the alkyl group contains up to six carbon atoms, e.g., perfluoro (methyl vinyl ether); the monoolefin is preferably a straight or branched chain compound having a terminal ethylenic double bond and containing less than six carbon atoms, especially two or three carbon atoms.

The polymer preferably consists of units derived from fluorine-containing monomers. When units which derive from other monomers are present, the amount thereof is preferably less than about 30 mole %, more preferably less than 15 mole %; such other monomers include, for example, olefins containing less than six carbon atoms and having a terminal ethylenic double bond, especially ethylene and propylene. The fluoropolymer is thermoplastic or elastomeric depending on the mole ratio of the monomer(s) used and the process used in its manufacture.

Preferred thermoplastic fluoropolymers are homo- and copolymers of vinylidene fluoride, such as copolymers thereof with hexafluoropropylene. Preferred thermoplastic fluoropolymers are commercially available from Atochem under the trademark Kynar, for example, Kynar 7201 and Kynar 9301.

Preferred elastomers are copolymers of vinylidene fluoride and at least one other fluorinated monomer, especially one or more of hexafluoropropylene, tetrafluoroethylene and chlorotrifluoroethylene. Commercially available fluoroelastomers of this class include copolymers of vinylidene fluoride and hexafluoropropylene such as Viton A, Viton A35, and Viton AHV sold by duPont; copolymers of vinylidene fluoride, hexafluoropropylene and tetrafluoroethylene such as Viton B and Viton B50 sold by duPont; and copolymers of vinylidene fluoride and chlorotrifluoroethylene such as Kel-F sold by Minnesota Mining and Manufacturing Company.

To reduce the amount of force that is necessary for removal of the sleeve from the fingers it is desirable that there be a suitable lubricant at the interface between the fingers and the sleeve. The lubricant is applied using any of a variety of techniques, including, for example, dipping the fingers into the lubricant dispersion before placement of the sleeves on the fingers, swabbing the inside of the sleeves with the lubricant dispersion before application to the fingers, and/or filling the sleeves with lubricant dispersion, or combinations of such techniques.

According to the preferred embodiment, the lubricant is applied to the fingers/sleeves as an aqueous dispersion. A preferred lubricant in the aqueous dispersion is of the form:

where:

x and y are independently integers preferably greater than 10, more preferably greater than 13, and more preferably greater than 14; x and y are preferably less than 30, more preferably less than 25, and most preferably less than 20; and in most preferred embodiments x and y range from about 16 and 19.

$M^{++}$ is one or more metal ions, preferably divalent, most preferably Ca, Mg, or Zn.

Other lubricants which are used according to some embodiments include fatty alcohols, fatty alcohol dicarboxylic acid esters, fatty acid esters, fatty acids, fatty acid monoamides, fatty acid diamides (amide wax), oligomeric fatty acid esters (fatty acid complex esters), fatty alcohol, fatty acid esters, wax acids, wax acid esters, polar polyethylene waxes, nonpolar polyethylene waxes, and parafin waxes.

According to a preferred embodiment, the lubricant is provided in an amount such that it comprises more than about 0.1% and preferably more than 0.25% by weight of the aqueous dispersion before it is applied to the substrate/sleeve, although even lower concentrations may be used depending on the length of the sleeve or substrate. Unless otherwise specified, all concentrations specified herein are on a by weight basis. In a preferred embodiment the lubricant comprises more than about 1% by weight of the dispersion, preferably more than 3% of the dispersion and more preferably more than 5% of the dispersion. To prevent precipitation of the lubricant, the lubricant comprises less than about 15% of the dispersion in preferred embodiments, more preferably less than 10% of the dispersion, and most preferably less than 7% of the dispersion.

As discussed above, the aqueous dispersion preferably also contains a surfactant that will ensure 1) the dispersion of lubricant is stable, and 2) the dispersion wets interfacing (abutting) surfaces of the substrate and the sleeve adequately. According to a preferred aspect of the invention, the surfactant reduces the surface tension of the dispersion to less than about 50 dyne/cm, preferably less than 40 dyne/cm, and more preferably less than 30 dyne/cm, as measured by ASTM standard D1331-89 (tensiometer), which is incorporated herein by reference for all purposes.

The surfactant may take on any one of a wide variety of compositional forms. According to a preferred embodiment, the surfactant is a metal dioctyl sulfosuccinate. Other surfactants include, for example, nonionic, anionic, cationic, and amphoteric surfactants. Still other surfactants include micelles surfactants, olefin surfactants, and quaternary ammonium surfactants.

According to a most preferred embodiment, the surfactant comprises one or both of sodium dioctyl sulfosuccinate with a molecular weight of between about 400 and 500 and fluorinated alkyl polyoxethylene ethanol of various molecular weights.

The surfactant is provided in quantity sufficient to achieve the desired surface tension. In a preferred embodiment the surfactant comprises more than about 0.1% of the dispersion. In a preferred embodiment the surfactant comprises more than about 0.5% of the dispersion. In a particularly preferred embodiment, the surfactant comprises between about 0.5% and 1% of the dispersion.

Preferably, the balance of the dispersion is water. In one embodiment the total amount of water in the lubricant system is more than about 80%, preferably more than 85%, more preferably more than 90%, and most preferably more than about 92%.

The lubricating dispersion is preferably prepared by mixing the water, lubricant, and surfactant at ambient temperature, followed by vigorous agitation. The lubricant is preferably applied to the inner surface of the tube by circulating the lubricant dispersion through an uncut roll of tubing, followed by circulation of air through the uncut tubing to blow out and evaporate the aqueous component of the dispersion (e.g., for 10 minutes). In some embodiments, the lubricant is applied to the application substrate by spraying, followed by drying of the application substrate. A combination of the above methods may be used in some embodiments.

After the lubricant is applied, the tubing is cut in appropriate lengths for application to the substrate. Each length of tubing (sleeve) is then slid on to a finger of the substrate, and if necessary the tubing is partially shrunk by appropriate application of heat. Preferably, the tubing is shrunk at least enough so that when the fingers are placed in a downward facing position the sleeve will not fall off of the fingers. Preferably the tubing is shrunk to the point where the sleeve substantially matches the abutting contours of the fingers. The finger prevents the sleeve from recovering completely. This process is referred to as "restricted" recovery. Thereafter, the substrate is fed into a typewriter, computer printer, or other suitable printing means for application of appropriate labeling on each sleeve.

The sleeve is subsequently removed from the substrate. In some embodiments, the user may simply grasp the tubing and pull the tubing off of the substrate. According to preferred embodiments the tubing is grasped with a suitable tool such as shown in FIG. 1. The tubing is then applied to the cable, and is shrunk further by application of additional heat, radiation, or the like using means known to those of skill in the art.

II. Examples

The following examples are provided to illustrate specific aspects and benefits of the invention.

TABLE 1

Experimental Summary
TMS SOLVENT REPLACEMENT, HEATING
TEMPERATURE (C), TIME (MIN) RECOVERY
$H_2O$ + 5% CaS + 0.2% AEROSOL

| TUBING TYPE/SIZE | STANDARD TMS | THIN WALL TMS | HI TEMP TMS | SP TMS | PERMARK FB | NUCLEAR TMS |
|---|---|---|---|---|---|---|
| 3/32" | 200 C 3 Min | N/A | 200 C 3 Min | 200 C 3 Min | 200 C 3 Min | 200 C 3 Min |
| ¼" | 200 C 3 Min | 200 C 3 Min | 200 C 3 Min | 150 C 3 Min | 200 C 3 Min | 200 C 3 Min |
| ⅜" | 200 C 3 Min | N/A | 200 C 3 Min | N/A | N/A | N/A |
| ½" | 150 C 3 Min | N/A | 200 C 3 Min | 90 C 3 Min | 200 C 3 Min | 150 C 3 Min |

N/A = Not Available

TABLE 2

PULL OUT FORCE (LBS)
(Average Results)
Aqueous dispersion: (5% b.w. calcium stearate, 0.2% b.w. Aerosol OT*).

| TUBING TYPE/SIZE TUBING | STANDARD TMS | THIN WALL TMS | HI TEMP TMS | SP TMS | PERMARK FB | NUCLEAR TMS |
|---|---|---|---|---|---|---|
| 3/32" | 2.50 | 3.00 | 3.48 | 2.60 | 2.62 | 4.62 |
| ¼" | 4.00 | 6.00 | 4.70 | 2.80 | 4.40 | 4.20 |
| ⅜" | 3.30 | N/A | 4.50 | N/A | N/A | N/A |
| ½" | 4.00 | N/A | 4.80 | 1.80 | 5.90 | 4.70 |

N/A = Not Available
*Aerosol OT is a commerial 10% aqueous solution of sodium dioctyl sulfoccinate

A. Example 1

The objective of this experiment was to determine the pull out force (in lbs) of tubing on a nylon bandolier after partial recovery using $H_2O$+5% calcium stearate and 0.2% aerosol ot. Tubing sizes of 3/32", ¼", ⅜", and ½" were utilized made from two types of compounds (polyolefin and fluoropolymer) to give a general understanding of lubricity as a function of surface area and types of compounds utilized. Parameters of the various experiments are listed in Table 1.

An aqueous dispersion comprised of $H_2O$+5% by weight calcium stearate and 0.2% by weight aqueous solution of 10% sodium dioctyl sulfosuccinate was mixed vigorously in a plastic container for 5 minutes and then poured inside the sample tubing. The tubing sample was clamped at both ends and shaken for 10 seconds. After 10 seconds, the dispersion was poured back into the container and the tubing was left to dry for 30 minutes at 23° C. The tubing was then cut to length, placed on the bandolier, recovered, and pulled off of the bandolier. The force required to pull the tubing off of the bandolier was measured by the force gauge shown in FIG. 3.

Figure 3:
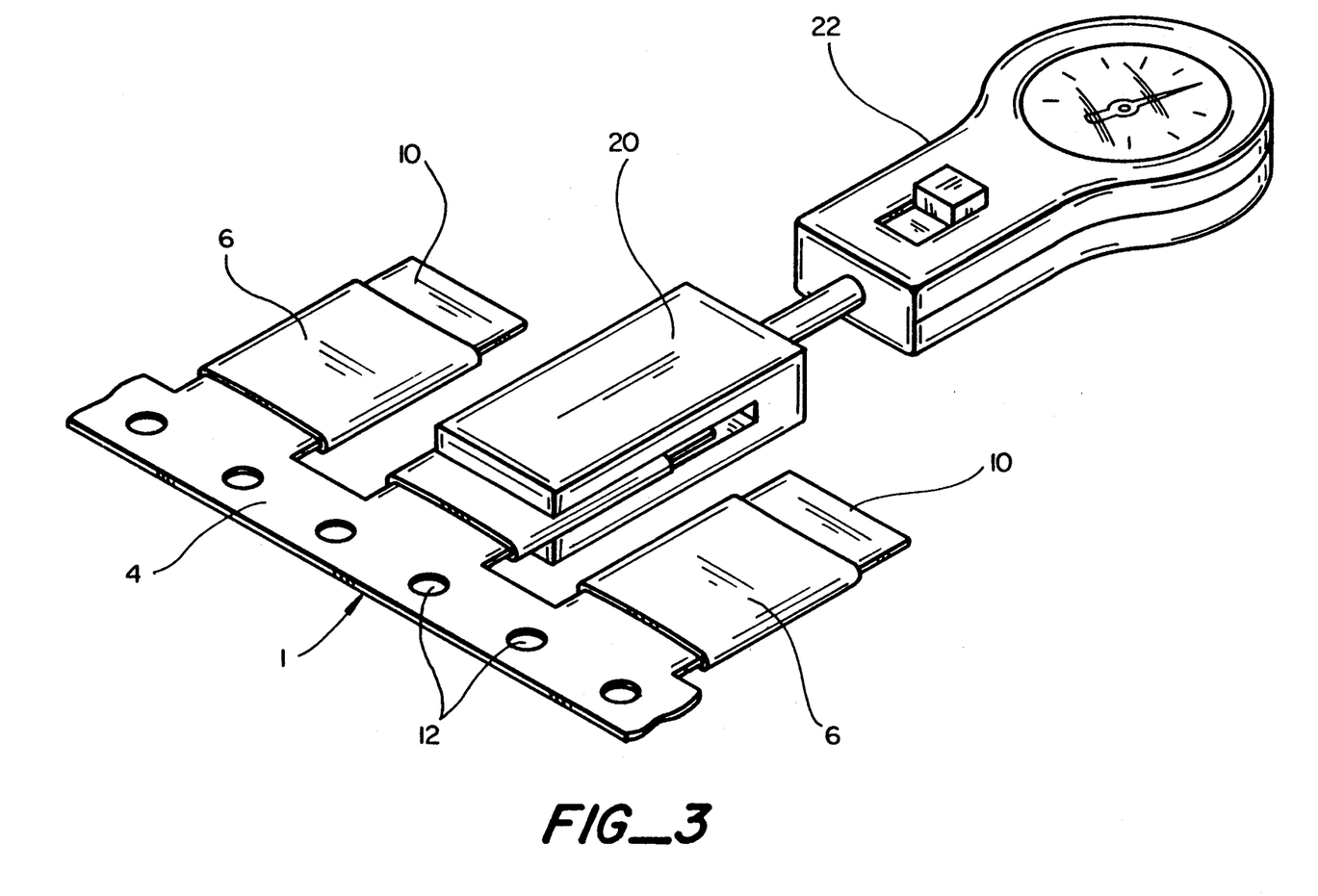
FIG. 3 illustrates the device used to determine pull-off force.

As shown in FIG. 3, the force for removal of the tubing from the substrate is measured by removing the tubing from the substrate with a removal bracket that is similar to the tool shown in FIG. 1 and used with the TMS ® system. The bracket is attached to a conventional force measurement gauge 22, which indicates the force (in pounds according to the experiments herein) that is being applied to the tubing as it is pulled off of the substrate.

The results show that all tubing sizes and types were within the desired TMS ® system 90 pullout force of less than 6 lbs for polyolefins and 10 lbs for fluoropolymers. Average pull out force for the various materials and tubing sizes is provided in detail in Table 2.

The aqueous dispersion proved to be a satisfactory replacement for CFC TF 113 type Freon from Dupont as shown in Table 3. Accordingly, not only will the aqueous lubricant dispersions described herein be environmentally acceptable, but they will often provide superior performance.

TABLE 3

| Tubing | Average Pull Out Force Freon Process (lbs) | Average Pull Out Force Water Process (lbs) |
|---|---|---|
| ⅜" HT-TMS | 5.5 | 4.5 |
| ⅜" Standard TMS | 3.8 | 3.3 |

B. Example 2

A water process which varied from the one described above was utilized. The process differed in that the lubricant was placed on the bandolier. Laboratory experimentation indicated that a pre-punched nylon carrier immersed for 10 seconds in a water dispersion of calcium stearate (5% calcium stearate w/w and 0.2% w/w of 10% aqueous sodium dioctyl sulfosuccinate), resulted in acceptable pull out forces. The calcium stearate had an average particle size of about $d=13\pm2\mu$ (microns).

Table 4 summarizes the results. The results show higher, but acceptable, pull out forces when the lubricant is applied to the bandolier fingers directly.

TABLE 4

| Tubing | Average Pull Out Force Freon Process (lbs) | Average Pull Out Force Water Process (lbs) | Spec (lbs) |
|---|---|---|---|
| ¼" TMS | 3.3 | 5.2 | ≦6 |
| ¼" HT-TMS | 6.4 | 7.9 | ≦10 |

It is believed that superior results may be obtained with (1) longer dipping time and (11) a higher concentration of calcium stearate. Temperature of the water dispersion is believed to affect negatively the pull out forces (that is higher temperature leads to higher pull-out forces).

It is interesting to note that the water-based process results in lower pull out forces than those obtained using Freon when the process of using lubricant inside the TMS tubing (as opposed to lubricant on the Nylon carrier) is utilized.

III. Conclusion

The above description is illustrative and not restrictive. Many variations of the invention will become apparent to those of skill in the art upon review of this disclosure. Merely by way of example embodiments of the invention may be used with a variety of surfactants and the like. The scope of the invention should, therefore, be determined not with reference to the above description, but instead should be determined with reference to the appended claims along with their full scope of equivalents.

I claim:

1. A process of placing a sleeve on a cable comprising:
    A) wetting at least one of:
        a) the internal surfaces of the sleeve and
        b) the external surfaces of a substrate on which the sleeve is to be placed
        with an aqueous mixture comprising a lubricant;
    B) draining excess aqueous mixture from the wetted surfaces;
    C) placing the sleeve into close and conforming contact with the substrate;
    D) sliding the sleeve off of the substrate; and
    E) placing the sleeve over the cable:
wherein the lubricant is applied in an amount effective to reduce the amount of force necessary for removal of the sleeve from the substrate.

2. A process is recited in claim 1 wherein the wetted surfaces are dried prior to placing the sleeve into contact with the substrate.

3. The process recited in claim 1 wherein said aqueous mixture is a dispersion of lubricant particles.

4. The process recited in claim 3 wherein the aqueous mixture further comprises a surfactant.

5. The process recited in claim 1 wherein said lubricant comprises calcium stearate.

6. The process recited in claim 4 wherein said surfactant comprises sodium dioctyl sulfosuccinate or a fluorinated alkyl polyoxethylene ethanol.

7. The process recited in claim 1 wherein said step of placing said sleeve in close and conforming contact with said substrate is accomplished by the step of heat shrinking said sleeve.

8. A process of placing a sleeve on a cable comprising:
    A) wetting at least one of:
        a) the internal surfaces of the sleeve and
        b) the external surfaces of a substrate on which the sleeve is to be placed
        with an an aqueous mixture comprising:
        a) at least 80% water;
        b) lubricant particles comprising a mixture of molecules independently having the formula:

where:
    x and y are independently integers greater than 10, and
    c) $M^{++}$ is one or more divalent metal ions,
    the lubricant particles comprising between 0.25 and 15% of the aqueous mixture by weight and a surfactant in an amount sufficient to reduce the surface tension of the aqueous mixture to less than 50 dyne/cm:
    B) draining excess aqueous mixture from the wetted surfaces:
    C) placing the sleeve into close and conforming contact with the substrate:
    D) sliding the sleeve off of the substrate: and
    E) placing the sleeve over the cable.

9. The process as recited in claim 8 wherein said mixture of molecules comprises more than 0.25% of the aqueous mixture by weight.

10. The process as recited in claim 9 wherein said mixture of molecules comprises more than 1% of the aqueous mixture by weight.

11. The process as recited in claim 10 wherein said mixture of molecules comprises more than 5% of the aqueous mixture by weight.

12. The process as recited in claim 8 wherein x and y independently range from 16 to 19.

13. The process as recited in claim 8 wherein M is calcium, magnesium or zinc.

14. The process as recited in claim 1 wherein said substrate is made of nylon.

* * * * *